UNITED STATES PATENT OFFICE 2,585,755

POISONS FOR DESTROYING INSECTS SELECTIVELY BY THE USE OF ALKALI-SOLUBLE COATINGS ON SAID POISONS

Franz Duspiva, Tutzing, Oberbayern, Germany, assignor to Pest Control Limited, Bourn, England, a British company No Drawing. Application December 18, 1950, Serial No. 201,491. In Great Britain December 14, 1949

8 Claims. (Cl. 167—42)

This invention relates to poisons for destroying insects.

British Patents Nos. 505,853 and 601,558 disclose that many insecticides which are normally lethal to most insects can be made more selective by coating the particles with films of water-insoluble materials such as cellulose, hemi-cellulose and vegetable proteins which are dissolved or disintegrated by the digestive juices of some insects but not by those of other insects. In particular, digestion of coating materials of vegetable origin is more rapid in the gut of phytophagous insects than in that of carnivorous insects, and in this way a desirable selectivity of toxic action of an otherwise non-selective insecticide can be achieved.

The above-mentioned selective solution or disintegration of cellulose, hemi-celluloses and vegetable proteins, is due to the action of enzymes occurring in the gut of some insects or in the bacteria normally inhibiting the gut.

It is an object of this invention to provide an improved poison for destroying insects wherein particles of a stomach insecticide are coated with an improved water-insoluble coating.

According to the present invention use is made of other differences between the digestive juices of most phytophagous insects, especially Lepidoptera, on the one hand, and most carnivorous insects on the other hand, in that the former are generally considerably more alkaline than the latter, having a pH about 7.5 to 9.5 as against 4.5 to 7.5.

According to the present invention a poison for destroying insects comprises particles of a stomach insecticide coated with an organic substance having a molecular weight of at least 10,000 which contains weak acid groups which are, however, insufficient to confer solubility in water under acid conditions.

Such weak organic acids, insoluble as such, in water, have a dissociation constant of less than $10^{-4}$ gm.-mols. per litre and are converted into salts in alkaline water and these salts may be soluble. Examples of these substances are the naturally occurring alginic acid derived from seaweed which is insoluble as such in water but is soluble in dilute solutions of alkali metal hydroxides or carbonates, but which may be converted to the insoluble calcium salt if calcium ions are present in sufficient concentration, and cellulose-acetate-hydrogen-phthalate, which is a mixed phthalic acetic ester of cellulose and is insoluble as such in water but is soluble in dilute solutions of alkali metal carbonates or hydroxides or of alkaline earth hydroxides.

It is known to use cellulose-acetate-hydrogen-phthalate as a coating for certain pharmaceutical preparations to prevent their solution in the acid juices of the stomach while permitting their solution in the alkaline juices in the small intestine, as is described by C. Lee Huyck, Journal of the American Pharmaceutical Association, Practical Pharmaceutical Edition, 1946, vol. 7, page 86.

Examples of stomach insecticides are 4.4'-dichlordiphenyl-$\beta.\beta.\beta$ - trichlorethane (hereinafter referred to as "D. D. T.") and $\gamma$-benzene hexachloride (which expression as used herein means the $\gamma$-isomer itself or its mixtures with one or more of the $\alpha$, $\beta$ and $\gamma$ isomers), 1.2.3.4.6.8.10.10-octachloro-6.7-dihydrodicyclopentadiene (known in the art as "Chlordane"), 1.2.3.4.10.10-hexachloro - 1.4.4a.5.6.7.8.8a - octahydro - 1.4.5.8-dimethanonaphthalene (known in the art as "Aldrin"), and 1.2.3.4.10.10-hexachloro-6.7-epoxy-1.4.4a.5.6.7.8.8a - octahydro - 1.4.5.8 - dimethanonaphthalene (known in the art as "Dieldrin").

The poison may be prepared by grinding the stomach insecticide in an alkaline solution of the weak organic acid and spraying the mixture on to an agitated surface of water conatining mineral acid by the action of which the free weak organic acid is formed and coagulates as an insoulble film around particles or groups of particles of the stomach insecticide.

The insoluble films so obtained may be made generally more resistant to attack by subsequent drying, as for example spray drying. Also the alkaline soluble forms of these coating substances may be dried around the particles by spray drying the original suspension, and simultaneously converted to the acid form by maintaining the vapour of a volatile acid such as hydrochloric acid or acetic acid in the spray chamber, or they may be converted to the acid forms after drying in the ordinary way by subsequent treatment with acid vapour or solutions.

The following examples illustrate how the process of the present invention may be performed:

Example 1

2 gms. of D. D. T. were ground in a small ball mill with 100 mls. of a 4% aqueous solution of sodium alginate until the particles were mostly in the range from 1–5$\mu$ diameter. By means of a fine air jet sprayer of conventional design this suspension was sprayed into a long wide vertical tube down the walls of which a 1% solution of acetic acid was caused to flow by means of a pump which returned this coagulating liquid from the bottom to the top. Examination of the resulting product, in which the insecticidal suspension could be concentrated by sedimentation, showed that patricles of D. D. T. were embedded in flat discs of gelatinous alginic acid.

*Example 2*

A similar result was obtained using a 4% solution of cellulose-acetate-hydrogen-phthalate in a dilute solution of sodium carbonate in place of the sodium alginate of Example 1.

*Example 3*

A suspension of D. D. T. in sodium alginate as described in Example 1 was sprayed into a chamber through which vapour of concentrated acetic acid was drawn by means of a suction pump which pulled previously dried air through a bubbler containing glacial acetic acid. In this way an apparently dry solid deposit collected at the bottom of the vessel which was further completely dried by continued agitation in a dry atmosphere. Examination under a microscope showed particles of D. D. T. to be embedded in more or less transparent granules associated with crystals, presumably of sodium acetate. Subsequent gently grinding under water produced a fairly fine suspension of D. D. T. coated with soluble alginate.

What I claim is:

1. A poison for destroying insects which comprises particles of a highly chlorinated hydrocarbon stomach insecticide coated with alginic acid.

2. A poison for destroying insects which comprises particles of a highly chlorinated hydrocarbon stomach insecticide coated with cellulose-acetate-hydrogen-phthalate.

3. A process for the manufacture of a poison for destroying insects which comprises grinding a highly chlorinated hydrocarbon stomach insecticide in an alkaline solution of alginic acid, and spraying the mixture on to an agitated surface of water containing mineral acid whereby an insoluble film of alginic acid is formed and coagulates around particles of the stomach insecticide.

4. A process for the manufacture of a poison for destroying insects which comprises grinding a highly chlorinated hydrocarbon stomach insecticide in an alkaline solution of cellulose-acetate-hydrogen-phthalate, and spraying the mixture on to an agitated surface of water containing mineral acid whereby an insoluble film of cellulose-acetate-hydrogen-phthalate is formed and coagulates around particles of the stomach insecticide.

5. A process for the manufacture of a poison for destroying insects which comprises grinding a highly chlorinated hydrocarbon stomach insecticide in an alkaline solution of alginic acid and spray drying the mixture in the presence of a vapour of a volatile acid whereby an insoluble film of alginic acid is formed and coagulates around particles of the stomach insecticide.

6. A process for the manufacture of a poison for destroying insects which comprises grinding a highly chlorinated hydrocarbon stomach insecticide in an alkaline solution of cellulose-acetate-hydrogen-phthalate and spray drying the mixture in the presence of a vapour of a volatile acid whereby an insoluble film of cellulose-acetate-hydrogen-phthalate is formed and coagulates around particles of the stomach insecticide.

7. A process for the manufacture of a poison for destroying insects which comprises grinding a highly chlorinated hydrocarbon stomach insecticide in an alkaline solution of alginic acid, drying the mixture and treating the dried product with an acid whereby an insoluble film of alginic acid is formed and coagulates around particles of the stomach insecticide.

8. A process for the manufacture of a poison for destroying insects which comprises grinding a highly chlorinated hydrocarbon stomach insecticide in an alkaline solution of cellulose-acetate-hydrogen-phthalate, drying the mixture and treating the dried product with an acid whereby an insoluble film of cellulose-acetate-hydrogen-phthalate is formed and coagulates around particles of the stomach insecticide.

FRANZ DUSPIVA.

REFERENCES CITED

The following references are of record in the file of this patent:

UNITED STATES PATENTS

| Number | Name | Date |
|---|---|---|
| 2,107,852 | Bolton | Feb. 8, 1938 |
| 2,206,975 | Ripper | July 9, 1940 |
| 2,378,186 | Clark | June 12, 1945 |
| 2,417,388 | Whitner | Mar. 11, 1947 |

FOREIGN PATENTS

| Number | Country | Date |
|---|---|---|
| 526,276 | Britain | Sept. 13, 1940 |